(12) United States Patent
Heald et al.

(10) Patent No.: US 7,506,027 B1
(45) Date of Patent: Mar. 17, 2009

(54) METHOD AND SYSTEM FOR USING WORKPLACE COLLABORATION TOOLS TO RESERVE AND TRACK THE USAGE OF RESOURCES

(75) Inventors: Russell Heald, Eastleigh (GB); Lucas William Partridge, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/020,541

(22) Filed: Jan. 27, 2008

(51) Int. Cl.
*G06F 17/30* (2006.01)
*G06F 15/16* (2006.01)
(52) U.S. Cl. .............. 709/204; 709/206; 707/8
(58) Field of Classification Search ......... 709/204–206; 707/8; 710/220
See application file for complete search history.

(56) References Cited

U.S. PATENT DOCUMENTS

| | | | |
|---|---|---|---|
| 5,526,524 A | 6/1996 | Madduri | |
| 5,983,277 A | 11/1999 | Heile et al. | |
| 6,484,196 B1 * | 11/2002 | Maurille | 709/206 |
| 7,062,532 B1 | 6/2006 | Sweat et al. | |
| 7,330,971 B1 * | 2/2008 | Kukreja et al. | 713/168 |
| 2004/0044648 A1 | 3/2004 | Anfindsen et al. | |
| 2004/0122897 A1 | 6/2004 | Seelemann et al. | |

OTHER PUBLICATIONS

IBackup, Webmanager, user manual & web site, www.ibackup.com, Home page, Nov. 11, 2007, pp. 1-20, Internet web site/ publication.

* cited by examiner

*Primary Examiner*—Larry D Donaghue
(74) *Attorney, Agent, or Firm*—MaxValue IP, LLC

(57) ABSTRACT

A collaborative working application employing an instant messaging service allows a group of members to track the usage of a resource by dynamically creating an arbitrary resource name representing a resource of any type or representing a group of existing resource names, reserving and releasing the resource name in real-time by changing its virtual lock status, querying the resource status, and queuing against a locked resource name so as to be notified when the resource becomes available. The resource names may further be organized in a hierarchy for ease of management. Other features would also be discussed.

1 Claim, 2 Drawing Sheets

METHOD AND SYSTEM FOR USING WORKPLACE COLLABORATION TOOLS TO RESERVE AND TRACK THE USAGE OF RESOURCES

BACKGROUND OF THE INVENTION

Teams of workers sometimes make use of shared resources, usage of which needs to be restricted to a single user. An example is the IBM® System z Hardware Instrumentation tool, which records performance statistics for an entire Sysplex®, so that multiple users cannot simultaneously make use of the tool without corrupting each other's data. A second example is a pool of physical servers from which a team member may need to reserve one for exclusive use. A third example may be a publication, such as a book or magazine, which may only be on one person's desk at a time. The common feature of all these resources is that it is difficult to physically restrict access to the resource while it is in use. If the team of workers is physically distributed over a wide area, it is also difficult to determine whether the resource is in use, or if it is in use, who currently "owns" it.

An embodiment of this invention describes a means of using a collaborative working tool such as instant-messaging to manage a set of "virtual locks" such that a team of workers can reserve, release, and track usage of single-user resources.

Many types of software resources employ lock mechanisms and protocols to control the degree of concurrent usage. This is intended as a lightweight solution to those resources for which such lock mechanisms are not already implemented, however, it could be possible to provide plug-in points to interface with the "hard" locking capabilities of those resources which support them. The tool itself may not physically prevent concurrent access to resources, but serves as an aid to managing their shared usage.

SUMMARY OF THE INVENTION

A group of members is associated with the collaborative working application. Within the scope of this group, a resource in question is assigned an arbitrary name. Using the collaborating application, the members can then perform various actions against the name representing the resource: (1) create or delete a name representing a shared resource for which usage within the team needs to be tracked; (2) reserve and release the resource; (3) query the resource to determine whether or not the resource is in use and who within the group has reserved the resource; or (4) queue against the resource such that when the owner releases it, the next in line is notified about the resource availability. The collaborative application employs an instant messaging service for the members to collaborate, as well as for displaying the resources and communicating their lock status to the members. The collaborating application can further provide discussion threads associated with the defined resources to facilitate the collaboration among the members. The resources may be organized in a hierarchy for ease of management or they can be grouped to form a group resource. The system may also limit the number of resources a member may reserve concurrently.

Some features of this invention includes: (1) With the dynamic approach to defining resources, the group members are not limited to working with resources which have been pre-defined by an administrator; (2) With the ability to create an arbitrary name and represent different and any types of resource, group members are not limited to defining new rooms, projectors, files, or any other specific category of resource; and (3) the immediacy of being able to reserve and release the resource in real time.

DETAILED DESCRIPTION OF THE PREFERRED EMBODIMENTS

Figure 1:
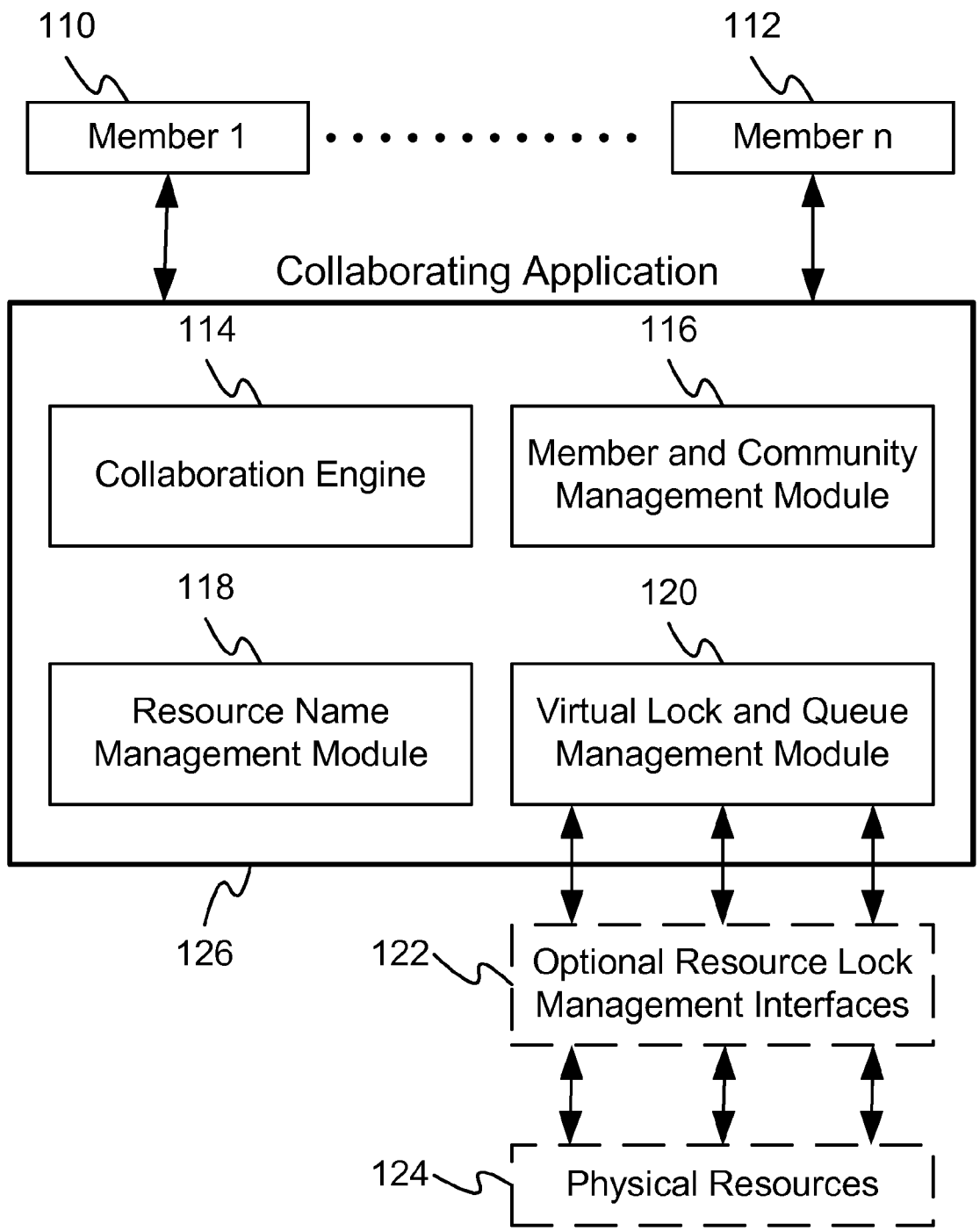
FIG. 1 is a schematic diagram of collaborative system where a group of members interact with the collaborating application.

Referring to FIG. 1, in one of the preferred embodiments of the invention, the team of workers is maintained as a group within the collaborative working application 126. An example of a group might be a Private Community within the IBM Sametime messaging application. The composition of the group is maintained by a Member and Community Management module 116 on the server(s) hosting the collaborating application 126. The members (referenced by 110 and 112) communicate and collaborate with each other through the collaborating application 126 employing a Collaborating Engine 114.

Members of the group have the authority to create entries within the group to represent resources for which usage needs to be tracked or controlled. The name could represent any kind of resource, including usage of a software tool, a server from a shared pool, or a periodical which is being distributed around the team. The names could be arbitrary and they could be arranged in a hierarchical structure to make management of the collection of resources easier. The Collaborating Application uses a Resource Name Management module 118 to maintain and manage these resource representatives.

When a team member requires the use of a resource, he or she can use the collaboration application 126 to determine whether or not the resource is already in use (i.e. locked). The status of the resource would be maintained by a Virtual Lock and Queue Management module 120 in the collaborating application 126. The collaborating application propagates the status of the resource to members. For example, an instant messaging window could be used to report the status of the resource to the instant message client on desktops in a similar fashion to that is used to report the status of instant messaging users. (122, 124)

Figure 2:
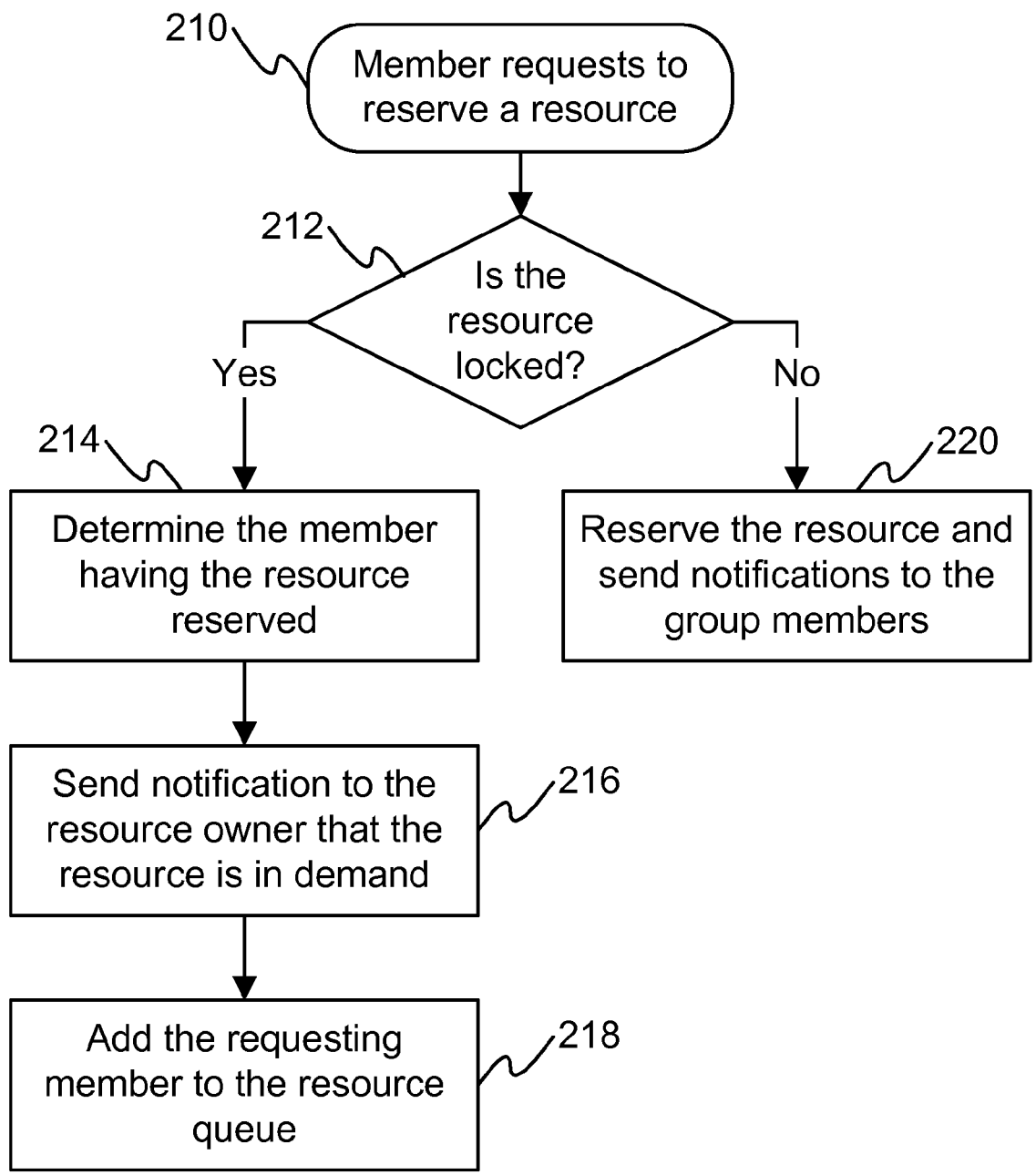
FIG. 2 is a process flow for when a member requests to reserve a resource.

Referring to FIG. 2, if the resource is free 212, the member 210 has the ability to use the collaboration application to Reserve it 220. The status will then be updated by the Virtual Lock and Queue Management module, and it will be reflected on the client desktops of the users within the group 220. The members also use the collaborating application to Release the resource when they are finished with it. In addition, the lock could also have an optional associated timeout value in order for the collaborating application to notify the member, e.g. when the member forgets to release the resource.

If the resource is in use 212, the member is able to determine from the collaboration application which team member has reserved the resource 214. For example, by hovering over the resource name in an instant messaging window, the member's client application 110 will receive the identity of resource owner from the collaborating application 126. If the resource is locked, the member could use the tool to "queue" for the resource 218, so that when the resource is freed, the first in line in the queue is notified that the resource is available. If the resource is not allocated during a predetermined interval, then the next in line is notified. Upon receipt of a new entry in the queue, i.e. the member who currently has the resource reserved, would also receive a notification that the resource is in demand 216.

The collaborating application will use an instant messaging service to communicate and send notifications to the members of the group.

Where an actual resource 124 supports a lock mechanism to physically restrict concurrent access, and the resource has an appropriate interface into the management of the lock 122, it might be possible to provide plug-ins to propagate the status of the resource usage from the collaboration application to the actual resource itself.

In one embodiment, using the name management module, the members define resources representing groups of already existing resource names. Each resource within a resource group may in turn be a resource group itself so long as a circular recursive relationship is not created between resources. A hierarchy of resources represents such a group; however, a resource in such a hierarchy may also belong to other groups. The status of a resource group is determined by the status of the resources within the group: If one resource in a group is in use (therefore locked), the group itself is marked as locked, but when all the resources in the resource group are free (i.e. unlocked) the group is marked as free (i.e. unlocked). For example, a group of mechanics could be working concurrently on different parts of a car, so each would mark his/her "reservation" against a part of the car being worked. They could define a resource called "car" containing other resources comprising parts of the car. Each mechanic will remove his/her reservation (i.e. lock) from the corresponding part when his/her work is complete. Once the lock status of a worked part resource is changed, the system updates the status of all the groups the resource belongs to (e.g. "car") recursively as necessary. Therefore, the supervisor would know that the car was ready for return to the customer when the locks are removed from all members car parts of the resource group "car" and status of "car" becomes unlocked. The advantage of this scheme is that the collaborating members can track the status of a group of resources as a whole. Furthermore, when a member requests reservation on a group, the lock is granted if the group is free, and the system will propagate down the lock status to all the resources within the group, recursively.

In another embodiment, the collaborating application limits the number of concurrent reservations a member may place on the resources defined within the group. This is to avoid inefficiencies caused by many resources being locked by one member.

In one embodiment, we have a system for working collaboratively among plurality of members belonging to a group. The system comprises:

a collaboration engine;
a virtual lock and queue management module;
a resource name management module; and
a member and community management module.

The collaboration engine provides an instant message service for the plurality of members defined and managed within the member and community management module.

A first one of the plurality of members dynamically creates an arbitrary resource name representing a resource of any type or representing a group of plurality of existing resource names via the resource name management module.

A second one of the plurality of members dynamically does one or more of the following actions on the arbitrary resource name:

deleting the arbitrary resource name via the resource name management module;

querying whether the arbitrary resource name is locked;
reserving the arbitrary resource name in real-time by locking the arbitrary resource name if the arbitrary resource name is unlocked;
releasing the arbitrary resource name in real-time by unlocking the arbitrary resource name if the arbitrary resource name is locked by the second one of the plurality of members; or
queuing against the arbitrary resource name via an entry in a corresponding queue identifying the second one of the plurality of members if the arbitrary resource name is locked, and causing the virtual lock and queue management module to notify a member who last reserved the arbitrary resource name that the arbitrary resource name is in demand by the second one of the plurality of members.

Upon release of the arbitrary resource name, the virtual lock and queue management module notifies the member identified by the earliest remaining entry in the corresponding queue.

Upon reserving of the arbitrary resource name, the virtual lock and queue management module removes any existing entry identifying the member reserving the arbitrary resource name, from the corresponding queue.

The virtual lock and queue management module notifies a member who last reserved the arbitrary resource name that a timeout event associated with a corresponding reservation of the arbitrary resource name has occurred, if a timeout value is associated with the reservation of the arbitrary resource name and the reservation of the arbitrary resource name has been in place longer than the timeout value.

The virtual lock and queue management module returns the status of the arbitrary resource name representing a group of plurality of the existing resource names as locked, unless the status of all the existing resource names are unlocked.

When the status of the arbitrary resource representing a group of plurality of the existing resource names becomes locked, the virtual lock and queue management module updates the status of all the existing resource names to locked.

When the status of the arbitrary resource name toggles between unlocked and locked, the system notifies the plurality of members, and the virtual lock and queue management module updates the status of a second arbitrary resource name representing a group to which the arbitrary resource name belongs.

The collaboration engine provides a discussion thread associated with the arbitrary resource name for the plurality of members. The system sends a notification to the plurality of members via the instant message service, and the system limits the number of a specific member's concurrent reservations.

One can also define a three-member set: red/green/amber, as color indicators, corresponding to Locked, Unlocked, and Partially-Locked status, to cover all situations, i.e. all, none, or partial lock, when all, none, or some are in use. Also, hovering the mouse over the pool (of server machines) would indicate the number of available resources, using a window or any other indicator. The color coding helps an efficient visual inspection of the status of the system, when we are dealing with multiple groups.

A system, apparatus, or device comprising one of the following items is an example of the invention: collaboration tool and device, workplace, administrator, files, resources, router, switches, network, communication media, cables, fiber optics, physical layer, buffer, nodes, packet switches, computer monitor, or any display device, applying the method mentioned above, for collaborating and using a shared resource, with reserve and release of the resources.

Any variations of the teachings above are also meant to be covered by this patent application.

The invention claimed is:

1. A system for working collaboratively among plurality of members belonging to a group, said system comprising:
    a collaboration engine;
    a virtual lock and queue management module;
    a resource name management module; and
    a member and community management module;
    wherein said system is hosted on one or more servers;
    wherein said collaboration engine provides an instant message service for said plurality of members defined and managed within said member and community management module;
    wherein a first one of said plurality of members dynamically creates an arbitrary resource name representing a resource of any type or representing a group of plurality of existing resource names via said resource name management module;
    wherein a second one of said plurality of members dynamically does one or more actions on said arbitrary resource name, selected from a set of actions comprising:
    deleting said arbitrary resource name via said resource name management module;
    querying whether said arbitrary resource name is locked;
    reserving said arbitrary resource name in real-time by locking said arbitrary resource name if said arbitrary resource name is unlocked;
    releasing said arbitrary resource name in real-time by unlocking said arbitrary resource name if said arbitrary resource name is locked by said second one of said plurality of members; or
    queuing against said arbitrary resource name via an entry in a corresponding queue identifying said second one of said plurality of members if said arbitrary resource name is locked, and causing said virtual lock and queue management module to notify a member who last reserved said arbitrary resource name that said arbitrary resource name is in demand by said second one of said plurality of members;
    wherein upon release of said arbitrary resource name, said virtual lock and queue management module notifies the member identified by the earliest remaining entry in said corresponding queue;
    wherein upon reserving of said arbitrary resource name, said virtual lock and queue management module removes any existing entry identifying the member reserving said arbitrary resource name, from said corresponding queue;
    wherein said virtual lock and queue management module notifies a member who last reserved said arbitrary resource name that a timeout event associated with a corresponding reservation of said arbitrary resource name has occurred, if a timeout value is associated with said reservation of said arbitrary resource name and said reservation of said arbitrary resource name has been in place longer than said timeout value;
    wherein said virtual lock and queue management module returns the status of said arbitrary resource name representing a group of plurality of said existing resource names as locked, unless the status of all said existing resource names are unlocked;
    wherein when the status of said arbitrary resource name representing a group of plurality of said existing resource names becomes locked, said virtual lock and queue management module updates the status of all said existing resource names to locked;
    wherein when the status of said arbitrary resource name toggles between unlocked and locked, said system notifies said plurality of members, and said virtual lock and queue management module updates the status of a second arbitrary resource name representing a group to which said arbitrary resource name belongs;
    wherein said collaboration engine provides a discussion thread associated with said arbitrary resource name for said plurality of members;
    wherein said system sends a notification to said plurality of members via said instant message service; and
    wherein said system limits the number of a specific member's concurrent reservations.

* * * * *